Nov. 27, 1962 H. B. SMITH ET AL 3,066,261
GATED ELECTRICAL STORAGE CIRCUIT
Filed Dec. 10, 1957

INVENTORS
HARRY B. SMITH
AND JOHN W. STUNTZ
BY Wade Koonty
George Fine
ATTORNEYS 3,066,261
Patented Nov. 27, 1962

3,066,261
GATED ELECTRICAL STORAGE CIRCUIT
Harry B. Smith, Baltimore, and John W. Stuntz, Hyattsville, Md., assignors, by mesne assignments, to the United States of America as represented by the Secretary of the Air Force
Filed Dec. 10, 1957, Ser. No. 701,940
2 Claims. (Cl. 328—121)

This invention relates to data processing and particularly to the storage and subsequent read-out of electrical energy representative of data being processed.

The invention is characterized by the use of circuitry functioning to change the time sequence of electrical information any requisite degree and simultaneously provide read-out facilities which may be loaded without disturbing the stored electrical information.

A feature of the present invention is a novel circuit utilized to store for future reference a voltage proportional to the peak value of a time varying input voltage.

An object of the present invention is to provide a gated storage circuit wherein a voltage proportional to the peak value of a time varying voltage is stored in a capacitor.

Another object of the present invention is to provide a novel circuit to maintain a stored voltage.

A still further object of this invention is to provide a circuit of a low equivalent generator impedance during the storage time thereby permitting a load to be placed upon the output without disturbing the stored voltage.

Another object of this invention is to provide a circuit to maintain a stored voltage for any desired period.

Further objects, novel features, and advantages will become apparent from the following description and the accompanying drawings, in which:

FIG. 2 (B) shows a desired output waveform for the circuit illustrated in FIG. 1; and FIG. 2 (C) shows a negative gate utilized in circuit illustrated in FIG. 1.

Figure 1:
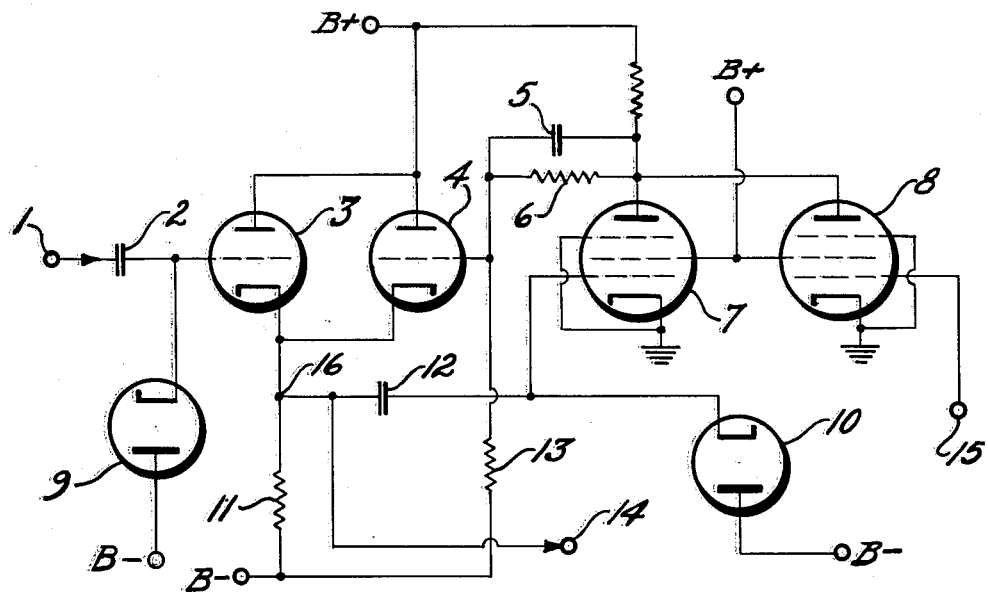
FIG. 1 is a schematic of a data processing gated storage circuit.

Referring in detail to FIGURE 1, the grid of triode 3 has connection with input terminal 1 by way of capacitor 2, and with the cathode of diode 9. The anode of diode 9 is connected to negative voltage source B—. The anodes and cathodes of triodes 3 and 4 are interconnected, both cathodes being connected to negative voltage source B— by way of common resistor 11, and both anodes being connected to positive voltage source B+.

Terminal 14, the output terminal, is connected to a conductor interconnecting junction point 16 and capacitor 12, in a circuit leading to the control grid of pentode 7, and to the cathode of diode 10, whose anode connects with negative voltage source B—, having an amplitude that is substantially equal to the cutoff voltage of pentode 7. Pentode 7 has the cathode and suppressor grid thereof grounded. The cathode and suppressor grid of pentode 8 are also grounded. Pentodes 7 and 8 have their anodes interconnected and both anodes are connected to positive voltage source B+ by the way of a common anode resistor. The anodes of pentodes 7 and 8 are also connected to the grid of triode 4 by way of resistor 6 and by-pass condenser 5, by-pass condenser 5 and resistor 6 being connected in parallel.

Resistor 13 is connected between the grid of triode 4 and negative voltage source B—, serving the common cathode resistor 11. Pentodes 7 and 8 have their screen grids connected to a common source of positive voltage B+, while the control grid of pentode 8 is connected to terminal 15. Terminal 15 receives negative impulse signals which are utilized for gating purposes, one of the negative impulse signals being in waveform as indicated at C of FIGURE 2.

Having now described the elements of the circuit illustrated in FIGURE 1 constituting the preferred embodiment of the invention, there will now be presented a statement of the manner in which the described component operates, one upon the other, to achieve the purposes of the invention. At terminal 1 there is received a positive going sawtooth input signal in waveform as shown at A in FIGURE 2. Simultaneously, the control grid of pentode 8 receives by way of terminal 15 a negative impulse signal in waveform as indicated at C of FIGURE 2. Normally, pentode 8 is conductive by reason of its low grid-to-cathode voltage, but becomes non-conductive (gated off) upon application to the control grid thereof of the aforesaid negative impulse signal. It is to be noted that when pentode 8 is cut off, there is a cessation of current flow therein which results in a change of anode potential being supplied to pentode 7 by reason of pentodes 7 and 8 having a common anode resistor which is connected to the common source of positive voltage, B+. Thus, upon the start of aforesaid positive going sawtooth, pentode 8 is cut off by the start of aforesaid negative impulse signal thereby permitting pentode 7 to take control.

The positive-going sawtooth input signal received by terminal 1 is applied to the grid of triode 3 by way of capacitor 2, said sawtooth signal being received simultaneously with the application of said negative impulse signal to said control grid of pentode 8. Diode 9 clamps the sawtooth signal applied to the grid of triode 3 at a predetermined direct current voltage level as determined by the magnitude of the negative voltage applied to the anode of diode 9. At the cathode of triode 3, there appears a positive-going sawtooth signal in waveform as indicated at B of FIGURE 2. The control grid of pentode 7 is also connected by way of diode 10 to a slightly negative bias. This bias is just beyond the grid operating range of pentode 7. As the cathode of triode 3 and the control grid of pentode 7 are interconnected by capacitor 12, a positive-going voltage appears at the control grid of pentode 7. As the sawtooth starts, the voltage at the control grid of pentode 7 goes in a positive direction until it reaches a magnitude at which grid current flows in pentode 7 which, in turn, serves to charge capacitor 12. The path of supply current is completed through triode 3. It is to be noted that the aforementioned sawtooth signal appearing at the cathode of triode 3 has a positive-going jump at the start thereof, this jump is equal to the magnitude of voltage necessary at the control grid of pentode 7 in order to cause grid current to flow therein. Charging current for storage capacitor 12 continues to flow during the positive-going portion of the sawtooth signal (in this case the current is constant because of the shape of the input signal). During this time—that is, during the application of aforesaid negative impulse signal to the control grid of pentode 8 and the simultaneous charging of capacitor 12—the anode of pentode 7 is at a relatively low potential, thereby cutting off triode 4. Aforementioned relatively low potential at the anode of pentode 7 is caused by the change of current flow in pentode 7, by reason of grid current flow and in consequency thereof, there is a voltage drop across its anode resistor. The aforementioned cutting off of triode 4 results from the D.C. coupling provided by the combination of resistors 6 and 13 since the voltage at the anode side of resistor 6 is lowered, the magnitude of voltage appearing at the grid of triode 4 is also lowered to such a magnitude as to cut off conduction therein.

Figure 2:
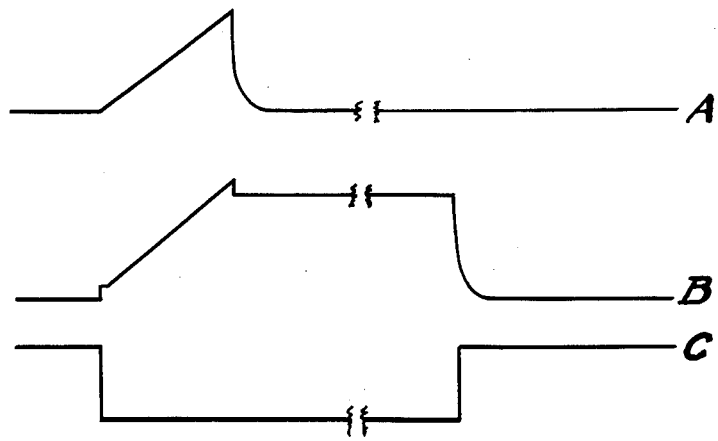
FIG. 2 (A) shows a positive going sawtooth waveform.

When the positive-going sawtooth signal ceases to rise, capacitor 12 is charged to an amount proportional to the peak value of said positive-going input sawtooth signal and at this instant a small negative-going jump in voltage occurs in the sawtooth signal appearing at the cathode of triode 3, said negative-going jump being illustrated in the waveform indicated at B of FIGURE 2. The exact cause of the small negative jump will become apparent after the subsequent explanation of the storage action of the circuit.

When the positive-going sawtooth signal at the cathode of triode 3 ceases to rise, in a positive direction, grid current stops flowing in pentode 7 as there is no longer an adequate potential gradient between grid and cathode. As a result thereof, there is a change of current flow in pentode 7, and as a consequence thereof its anode potential rises, thereby causing the D.C. potential at the grid of triode 4 to change sufficiently to permit conduction therein.

The charge is retained on storage capacitor 12 by virtue of the fact that the voltage at the cathodes of electron discharge devices 3 and 4 is sustained by the current flow through electron discharge device 4. This in turn is controlled by the anode potential of electron discharge device 7 acting through the voltage divider formed by resistors 6 and 13 utilized to provide D.C. coupling. Capacitor 5 is in shunt with resistor 6 providing a smoothing effect thereby preventing any surge or transient voltage from effecting the operation of electron discharge device 4. The anode voltage of electron discharge device 7 is, of course, determined by the value of the small negative voltage on its control grid. The time that elapses for triode 4 to go from non-conduction to conduction results in the aforementioned negative-jump.

When the voltage stored in capacitor 12 is no longer desired, the pentode, electron discharge device 8 is turned on by removing the negative gate that is present at terminal 15. This interrupts the storage action by cutting off the current through, the triode, electron discharge device 4. The output thus returns to its quiescent value. However, in the absence of diode 10, storage capacitor 12 would still retain its charge since its grid end would be driven negative and remain so until storage capacitor 12 discharged through grid leakage. To prevent this a low discharge impedance path is provided to a slightly negative bias by diode 10. This bias is just beyond the grid operating range of, the pentode, electron discharge device 7 and its amount influences the magnitude of the initial positive jump of the output waveform B of FIG. 2.

Accordingly, while a particular embodiment of the invention has been shown it will be understood that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a gated electrical storage circuit comprising first, second, third and fourth electron discharge devices, each having at least an anode, a cathode and a control grid, said anodes of said first and second devices being interconnected and having a common anode voltage supply, said cathodes of said first and second devices also being interconnected and having a common cathode resistor, a capacitor interconnecting said cathodes of said first and second devices to said control grid of said third device, network means to direct current couple said anode of said third device to said control grid of said second device, means to control the current flow in said third device upon the application to said control grid of said fourth device of a negative impulse signal thus operating to cut off current flow in said fourth device, said current controlling means including a common anode resistor and anode voltage supply for said third and fourth devices, a positive going sawtooth input signal being received at said control grid of said first device simultaneously with said application of said negative impulse signal to said fourth device, means to initiate grid current flow in said third device when a positive-going sawtooth signal appears at said cathodes of said first and second devices, said grid current flow operating to charge said capacitor and simultaneously operating to cut off current flow in said second device during said charging operation, said grid current initiating means also operating to restore current flow in said second device upon the cessation of the rise period of said positive-going sawtooth signal, and means to discharge said capacitor upon the cessation of said negative impulse signal.

2. In a gated electrical storage circuit comprising first, second, third and fourth electron discharge devices, each having at least an anode, a cathode and a control grid, said anodes of said first and second devices being interconnected and having a common anode voltage supply, said cathodes of said first and second devices also being interconnected and having a common cathode resistor, a capacitor interconnecting said cathodes of said first and second devices to said control grid of said third device, network means to direct current couple said anode of said third device to said control grid of said second device, means to control the current flow in said third device upon the application to said control grid of said fourth device of a negative impulse signal, said current control means including a common anode resistor and anode voltage supply for said third and fourth devices, means to clamp the input signal received by said control grid of said first device, a positive-going sawtooth input signal being received by said control grid of said first device simultaneously with said application of said negative impulse signal to said fourth device, means to initiate grid current flow in said third device upon the receipt at said cathodes of said first and second devices of a positive-going sawtooth signal, said grid current flow operating to charge said capacitor and simultaneously operating to cut off current flow in said second device during said charging operation and also operating to restore current flow in said second device upon the cessation of the rise period of said positive-going sawtooth signal, said grid current initiating means including the cathode of a diode connected to said control grid of said third device and the anode of said diode being connected to a negative source of voltage, and means to discharge said capacitor upon the cessation of said negative impulse signal.

References Cited in the file of this patent

UNITED STATES PATENTS

| 2,468,687 | Schmitt | Apr. 26, 1949 |
| 2,624,770 | Yetter | Jan. 3, 1953 |
| 2,834,883 | Lukoff | May 13, 1958 |